(12) United States Patent
Back

(10) Patent No.: US 12,073,721 B2
(45) Date of Patent: Aug. 27, 2024

(54) METHOD FOR MANAGING TRANSPORT ON BASIS OF BLOCKCHAIN NETWORK, AND DEVICE AND SYSTEM FOR PERFORMING SAME

(71) Applicant: QUANTUM GATE INC., Seoul (KR)

(72) Inventor: Ju Yong Back, Seoul (KR)

(73) Assignee: QUANTUM GATE INC., Seoul (KR)

( * ) Notice: Subject to any disclaimer, the term of this patent is extended or adjusted under 35 U.S.C. 154(b) by 0 days.

(21) Appl. No.: 17/424,774

(22) PCT Filed: Aug. 24, 2020

(86) PCT No.: PCT/KR2020/011245
§ 371 (c)(1),
(2) Date: Jul. 21, 2021

(87) PCT Pub. No.: WO2021/034163
PCT Pub. Date: Feb. 25, 2021

(65) Prior Publication Data
US 2022/0068132 A1    Mar. 3, 2022

(30) Foreign Application Priority Data

Aug. 22, 2019  (KR) .................. 10-2019-0102758
Aug. 23, 2019  (KR) .................. 10-2019-0104007
(Continued)

(51) Int. Cl.
*G06Q 30/02*      (2023.01)
*G06Q 30/0208*    (2023.01)
(Continued)

(52) U.S. Cl.
CPC ... *G08G 1/096805* (2013.01); *G06Q 30/0208* (2013.01); *G08G 1/0116* (2013.01); *G06Q 2220/00* (2013.01)

(58) Field of Classification Search
CPC ...... G08G 1/0116; G08G 1/0141; G08G 1/04; H04L 63/0428; H04L 9/3236; H04L 12/40032

See application file for complete search history.

(56) References Cited

U.S. PATENT DOCUMENTS 10,930,144 B2 *  2/2021  Miller ................. G08G 1/04
2015/0319093 A1 * 11/2015  Stolfus ............. G08G 1/0141
                                                    370/237
(Continued)

FOREIGN PATENT DOCUMENTS

CN    108474662 A    8/2018
CN    109451467 A    3/2019
(Continued)

OTHER PUBLICATIONS

Jeong-Hoon Lee, "Eliminate Traffic Congestion using Blockchains". . . U.S. Ford obtained Patent (Comprehensive coverage), edaily, Mar. 28, 2018, pp. 1-2.
(Continued)

*Primary Examiner* — Saba Dagnew
(74) *Attorney, Agent, or Firm* — Sughrue Mion, PLLC

(57) ABSTRACT

A traffic management method based on a blockchain network includes: collecting traffic-related data through at least one of a vehicle, a user terminal corresponding to the vehicle, and a roadside unit (RSU); storing, by the RSU or the server, the traffic-related data in a blockchain network; and providing, by the server, feedback to the user terminal based on the traffic-related data stored in the blockchain network. The blockchain network is configured to include the RSU and the server.

15 Claims, 12 Drawing Sheets

(30) Foreign Application Priority Data

Sep. 11, 2019 (KR) .................. 10-2019-0112978
Jun. 15, 2020 (KR) .................. 10-2020-0072565

(51) Int. Cl.
G08G 1/01 (2006.01)
G08G 1/0968 (2006.01)

(56) References Cited

U.S. PATENT DOCUMENTS

| | | | |
|---|---|---|---|
| 2017/0184409 | A1 | 6/2017 | Glasgow et al. |
| 2017/0220998 | A1 | 8/2017 | Horn et al. |
| 2017/0294054 | A1* | 10/2017 | Rosenbaum ...... H04L 12/40032 |
| 2018/0018723 | A1 | 1/2018 | Nagla et al. |
| 2018/0082590 | A1 | 3/2018 | MacNeille et al. |
| 2018/0122234 | A1* | 5/2018 | Nascimento ..... G08G 1/096783 |
| 2019/0043388 | A1* | 2/2019 | Li ................... H04L 9/0618 |
| 2019/0066402 | A1 | 2/2019 | Unagami et al. |
| 2019/0096241 | A1* | 3/2019 | Gao ..................... G08G 1/04 |
| 2019/0228429 | A1* | 7/2019 | Mottur ............ G06Q 30/0601 |
| 2019/0287318 | A1* | 9/2019 | Fukuhara ............ H04L 63/0428 |
| 2019/0303463 | A1 | 10/2019 | Catalano et al. |
| 2020/0045552 | A1* | 2/2020 | Kim ................... H04W 12/069 |
| 2020/0073864 | A1* | 3/2020 | Jo ...................... G06F 21/64 |
| 2020/0074853 | A1 | 3/2020 | Miller et al. |
| 2020/0184404 | A1 | 6/2020 | Mezaael et al. |
| 2021/0112618 | A1 | 4/2021 | Jeon et al. |
| 2021/0261155 | A1 | 8/2021 | Jung |
| 2022/0067765 | A1 | 3/2022 | Cote et al. |
| 2022/0068133 | A1 | 3/2022 | Back et al. |
| 2022/0407704 | A1 | 12/2022 | Chen et al. |
| 2023/0008135 | A1 | 1/2023 | Back et al. |
| 2023/0249696 | A1 | 8/2023 | Back et al. |

FOREIGN PATENT DOCUMENTS

| | | |
|---|---|---|
| CN | 109658704 A | 4/2019 |
| CN | 109741601 A | 5/2019 |
| CN | 109993847 A | 7/2019 |
| GB | 2570775 A | 8/2019 |
| JP | 2019-040588 A | 3/2019 |
| KR | 2003-0071362 A | 9/2003 |
| KR | 10-2009-0038305 A | 4/2009 |
| KR | 10-2013-0005476 A | 1/2013 |
| KR | 10-2013-0015193 A | 2/2013 |
| KR | 10-2014-0058211 A | 5/2014 |
| KR | 10-1475037 B1 | 12/2014 |
| KR | 10-2016-0003580 A | 1/2016 |
| KR | 10-1587955 B1 | 1/2016 |
| KR | 10-2017-0033589 A | 3/2017 |
| KR | 10-2017-0082182 A | 7/2017 |
| KR | 10-1781583 B1 | 9/2017 |
| KR | 10-2018-0069356 A | 6/2018 |
| KR | 10-2018-0079847 A | 7/2018 |
| KR | 10-2018-0087395 A | 8/2018 |
| KR | 10-2018-0130623 A | 12/2018 |
| KR | 10-1957064 B1 | 3/2019 |
| KR | 10-1957917 B1 | 3/2019 |
| KR | 10-2019-0054935 A | 5/2019 |
| KR | 10-2019-0071065 A | 6/2019 |
| KR | 10-2031241 B1 | 10/2019 |
| KR | 10-2020-0022355 A | 3/2020 |
| KR | 10-2020-0027797 A | 3/2020 |
| KR | 10-2086966 B1 | 3/2020 |
| KR | 10-2130782 B1 | 7/2020 |
| KR | 10-2217564 B1 | 2/2021 |

OTHER PUBLICATIONS

International search report for PCT/KR2020/011245 dated Dec. 18, 2020.

International Search Report dated Feb. 26, 2021 in Application No. PCT/KR2020/017325.

International Search Report dated Dec. 18, 2020, in International Application No. PCT/KR2020/012075.

Chinese Office Action dated Feb. 8, 2024 in Application No. 202080008918.4.

* cited by examiner

METHOD FOR MANAGING TRANSPORT ON BASIS OF BLOCKCHAIN NETWORK, AND DEVICE AND SYSTEM FOR PERFORMING SAME

TECHNICAL FIELD

The embodiments disclosed herein relate to a traffic management method based on a blockchain network, and a device and system for performing the same.

BACKGROUND ART

Blockchain technology is a distributed data storage technology that duplicates data and stores it at multiple locations. Accordingly, it can be used in various fields requiring the reliability of stored data.

The Intelligent Transport System (ITS) is a transport structure and system for efficiently controlling traffic congestion and enhancing safety by using electric, electronic, and information & communication technologies.

In order for the ITS to provide traffic-related information or perform traffic-related control, it is necessary to collect traffic-related data from multiple vehicles. In this case, there is a problem in that it is difficult to verify the reliability of collected information. In addition, since collected information may contain personal information, high security is required.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

DISCLOSURE

Technical Problem

The embodiments disclosed herein are intended to provide a traffic management method and system using a blockchain network in order to ensure the reliability of data used for traffic management.

Technical Solution

The embodiments disclosed herein ensure the reliability of data by storing traffic-related data, collected through various devices, in a blockchain network. Furthermore, guidance on an action necessary to maintain traffic safety or a route capable of reducing traffic congestion is provided to a user based on traffic-related data, and a reward is provided when the user acts according to the guidance.

Advantageous Effects

According to the embodiment disclosed herein, vehicle driving information is stored in a blockchain network, and thus a user or the like may be prevented from freely forging or falsifying the vehicle driving information.

Furthermore, whether a user has safely driven is determined based on vehicle driving information, and a reward is provided to the user according to the result of the determination, thereby motivating the user to perform safe driving.

Furthermore, an action necessary to maintain traffic safety is determined based on traffic-related data, and a reward is provided to a user when the user acts accordingly, thereby motivating the user to perform safe driving.

Furthermore, traffic congestion levels are determined based on traffic-related data, and a route is recommended based thereon, thereby expecting the effect of reducing traffic congestion.

Moreover, when a user selects a recommended route having a low traffic congestion level, a reward is provided to the user, thereby motivating the user to actively contribute to avoiding traffic congestion.

The effects that can be obtained by the embodiments disclosed herein are not limited to the above-described effects, and other effects that have not been described above will be clearly understood by those having ordinary skill in the art, to which the present invention pertains, from the following description.

BEST MODE

Figure 1:
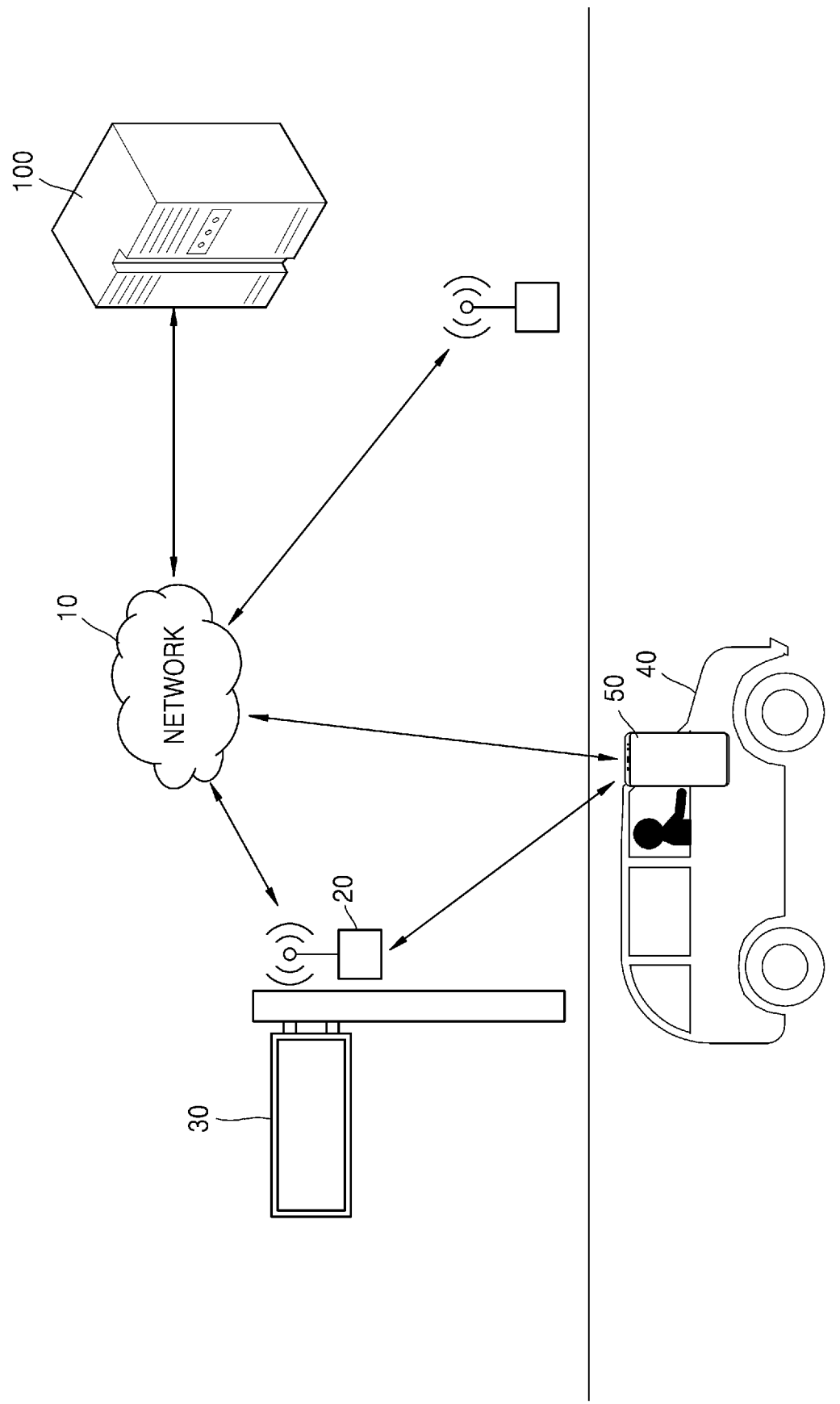
FIG. 1 is a diagram showing a traffic management system based on a blockchain according to an embodiment.

According to an embodiment, there is disclosed a traffic management method based on a blockchain network, the traffic management method including: collecting traffic-related data through at least one of a vehicle, a user terminal corresponding to the vehicle, and a roadside unit (RSU); storing, by the RSU or the server, the traffic-related data in a blockchain network; and providing, by the server, feedback to the user terminal based on the traffic-related data stored in the blockchain network; wherein the blockchain network is configured to include the RSU and the server.

According to another embodiment, there is disclosed a computer-readable storage medium having stored thereon a program for performing a traffic management method based on a blockchain network. In this case, the traffic management method includes: collecting traffic-related data through at least one of a vehicle, a user terminal corresponding to the vehicle, and a roadside unit (RSU); storing, by the RSU or the server, the traffic-related data in a blockchain network; and providing, by the server, feedback to the user terminal based on the traffic-related data stored in the blockchain network, and the blockchain network is configured to include the RSU and the server.

According to still another embodiment, there is disclosed a traffic management system based on a blockchain, the traffic management system including: a roadside unit (RSU) installed on a roadside, and configured to communicate with at least one of a vehicle and a user terminal corresponding to the vehicle; and a server connected to the RSU over a network; wherein the RSU directly collects traffic-related data or collects traffic-related data from at least one of the vehicle and the user terminal; wherein the server stores the traffic-related data in a blockchain network, and provides feedback to the user terminal based on the traffic-related data; and wherein the blockchain network is configured to include the RSU and the server.

MODE FOR INVENTION

Various embodiments will be described in detail below with reference to the accompanying drawings. The following embodiments may be modified to various different forms and then practiced. In order to more clearly illustrate features of the embodiments, detailed descriptions of items that are well known to those having ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being "connected" to another component, this includes not only a case where the one component is 'directly connected' to the other component but also a case where the one component is 'connected to the other component with a third component arranged therebetween.' Furthermore, when one portion is described as "including" one component, this does not mean that the portion does not exclude another component but means that the portion may further include another component, unless explicitly described to the contrary.

First, the meanings of the terms frequently used herein are defined.

'Traffic-related data' refers to a broad concept including all types of data that can affect traffic, such as traffic regulations, traffic conditions (e.g., the number and speed of vehicles on a road, and/or the like), road conditions (e.g., road conditions such as icing or construction, and/or the like), weather conditions, etc. Traffic-related data may include the identification information and location information of a device that has contributed to the collection and provision of the traffic-related data.

'Traffic safety information' is information that helps to maintain traffic safety. For example, traffic safety information is information indicating that a road is congested due to a large number of vehicles, the condition of the surface of a road is not good, an accident has occurred ahead, construction is in progress ahead, or there is an accident-prone section ahead. A user who operates a vehicle can prevent accidents by checking traffic safety information and operating the vehicle appropriately according to the information.

'Vehicle driving information' is various types of data related to the driving of a vehicle. For example, vehicle driving information may include instantaneous speed, acceleration, engine revolutions per minute (RPM), brake operation status, a vehicle location, tire pressure, temperature, a load weight measurement, the remaining fuel amount, a driving date, driving time, driving distance, etc. collected at predetermined periods.

An 'on-board unit (OBU)' is a device that is installed in a vehicle and is capable of calculation and communication. An OBU refers to a device for processing calculation using data collected through vehicle sensors (e.g., a LiDAR sensor, and/or the like) or communicating with external devices. In the embodiments described herein, an OBU can transmit traffic-related data, collected through the sensors of a vehicle, to a roadside unit or receive traffic safety information from a roadside unit by communicating with the roadside unit to be described below.

A 'roadside unit (RSU)' is a device that is installed on a roadside and communicates with an OBU. In the embodiments disclosed herein, roadside units (RSUs) may be installed independently at regular intervals on a roadside, or may be installed in existing infrastructure such as streetlights or traffic lights. Furthermore, in the embodiments disclosed herein, an RSU may be configured to include a processor and memory to serve as a node of a blockchain network. Moreover, in the embodiments disclosed herein, an RSU may include various types of devices (e.g., a camera, a localization sensor, an acoustic sensor, etc.) capable of collecting traffic-related data.

Terms that are not defined above will be defined below whenever necessary.

FIG. 1 is a diagram showing a traffic management system based on a blockchain according to an embodiment. Referring to FIG. 1, the traffic management system based on a blockchain according to the embodiment includes a network 10, an RSU 20, a variable message sign (VMS) 30, a vehicle 40, a user terminal 50, and a server 100. Furthermore, according to another embodiment, the traffic management system based on a blockchain may further include various types of traffic facility infrastructure, although not shown in FIG. 1.

The network 10 is a component that enables wired/wireless communication among a plurality of RSUs 20 and the user terminal 50, which are devices constituting a blockchain network, and servers 100.

As described above, the RSU 20 is installed on a roadside and communicates with an OBU installed in the vehicle 40, and may operate as a node of a blockchain network in which traffic-related data is stored. In particular, the RSU 20 may receive traffic-related data from the OBU installed in the vehicle 40 or the user terminal 50, or may directly collect traffic-related data through a sensor provided therein. The RSU 20 may transmit the received or collected traffic-related data to the server 100 over the network 10. In addition, the RSU 20 may receive traffic safety information from the server 100 and transmit it to the OBU installed in the vehicle 40 or the user terminal 50.

The VMS 30 is a component that displays traffic-related data or traffic safety information. According to an embodiment, some of the plurality of RSUs 20 may be installed to be connected to variable message signs (VMSs) 30. The RSU 20 connected to the VMS 30 may display traffic-related data or traffic safety information on the display screen of the VMS 30.

The OBU may be installed in the vehicle 40. The OBU may store traffic-related data (e.g., a vehicle number, a vehicle identification number, a vehicle speed, and/or a vehicle location) related to the vehicle in advance, may directly measure traffic-related data, or may receive traffic-related data from the vehicle 40. For example, sensors, such as a camera, an infrared sensor, radar, and/or a LiDAR, may be installed in the vehicle 40. Traffic-related data collected through these sensors may be transmitted to the OBU.

According to one embodiment, the vehicle 40 may include a digital tachograph (hereinafter referred to as the DTG). The DTG may collect the above-described vehicle driving information in real time. The DTG may directly store the collected vehicle driving information, or may transmit it to an external device such as the OBU. The DTG may be configured as a device separate from the OBU, but may also be incorporated into a single device through the integration of the DTG and the OBU.

The OBU may transmit the traffic-related data or vehicle driving information, stored in advance or received from the vehicle 40, to the RSU 20. In the following description, for convenience, operations performed by the OBU installed in the vehicle 40 will also be described as being performed by the vehicle 40.

The user terminal 50 refers to a terminal that is carried by a user who drives the vehicle 40. The user terminal 50 may directly collect traffic-related data, and may transmit it to the RSU 20 or the server 100 over the network 10. Furthermore, the user may check traffic safety information or receive a reward for the driving of the vehicle 40 by the user through the user terminal 50. To this end, the RSU 20 or the network 10 may transmit the traffic safety information or the reward to the user terminal 50. In this case, the provided reward may be in the form of a cryptocurrency mined for by at least one of a plurality of nodes constituting the blockchain network or in the form of an electronic voucher provided by another institution. An application configured to collect traffic-related data and transmit it to the outside or to receive traffic safety information or a reward from the outside may be installed on the user terminal 50. Furthermore, the user terminal 50 may perform the role of the DTG by directly collecting vehicle driving information.

According to the traffic management method based on a blockchain network according to the embodiment, various types of traffic-related data may be collected using at least one of the RSU 20, the vehicle 40, and the user terminal 50.

An example of collecting traffic-related data using at least one of the RSU 20, the vehicle 40, and the user terminal 50 will be described in detail as follows. For example, at least one of the above-described devices may determine the number of vehicles on a road, the state of the surface of the road, and/or the like by capturing an area including the road through a camera provided in the device and analyzing a photographed image. Furthermore, at least one of the above-described devices may determine the distances to the preceding and following vehicles by using a sensor (e.g., radar or LiDAR) provided in the device and configured to measure distances. Moreover, at least one of the above-described devices may determine a weather condition such as fog, rain, and snow by using a sensor provided in the device.

The collected traffic-related data may be stored in the blockchain network configured to include at least some of a plurality of RSUs 20, a plurality of user terminals 50, and the server 100. The plurality of RSUs 20, the plurality of user terminals 50, and the server 100 may each operate as a node constituting a part of the blockchain network. A part of these nodes may operate as a validation node configured to perform verification when data is stored. The traffic-related data is distributed and stored in a plurality of nodes through the verification of the verification node, and the distributed and stored data is connected to each other through a hash value, thereby ensuring the reliability of data.

As described above, the traffic-related data may include the identification information and location information of the device that has collected it. In other words, since the traffic-related data may include personal information such as a user's name, a phone number, and/or a user's location, the user may not want the traffic-related data to be distributed and stored in external devices.

In order to overcome this problem, according to an embodiment, the traffic-related data may be encrypted and then stored in the user terminal 50, and only the hash value of the encrypted data may be stored in the blockchain network. If necessary, the RSU 20 or the server 100 may request data from the user terminal 50 by referring to the hash value stored in the block. In response to the request, the user terminal 50 may decrypt the stored, encrypted data using a private key and then transmit it to the RSU 20 or the server 100. Alternatively, the user terminal 50 may transmit the encrypted data and the private key to the RSU 20 or the server 100, and the RSU 20 or the server 100 may decrypt the received, encrypted data by using the received private key. In this way, the reliability of data stored in the user terminal 50 may be ensured, and also sensitive personal information may be prevented from being divulged to the outside.

The vehicle 40 and the user terminal 50 may be provided with a reward from the server 100 by providing traffic-related data to the system. Accordingly, the user may be motivated to provide traffic-related data.

Figure 2:
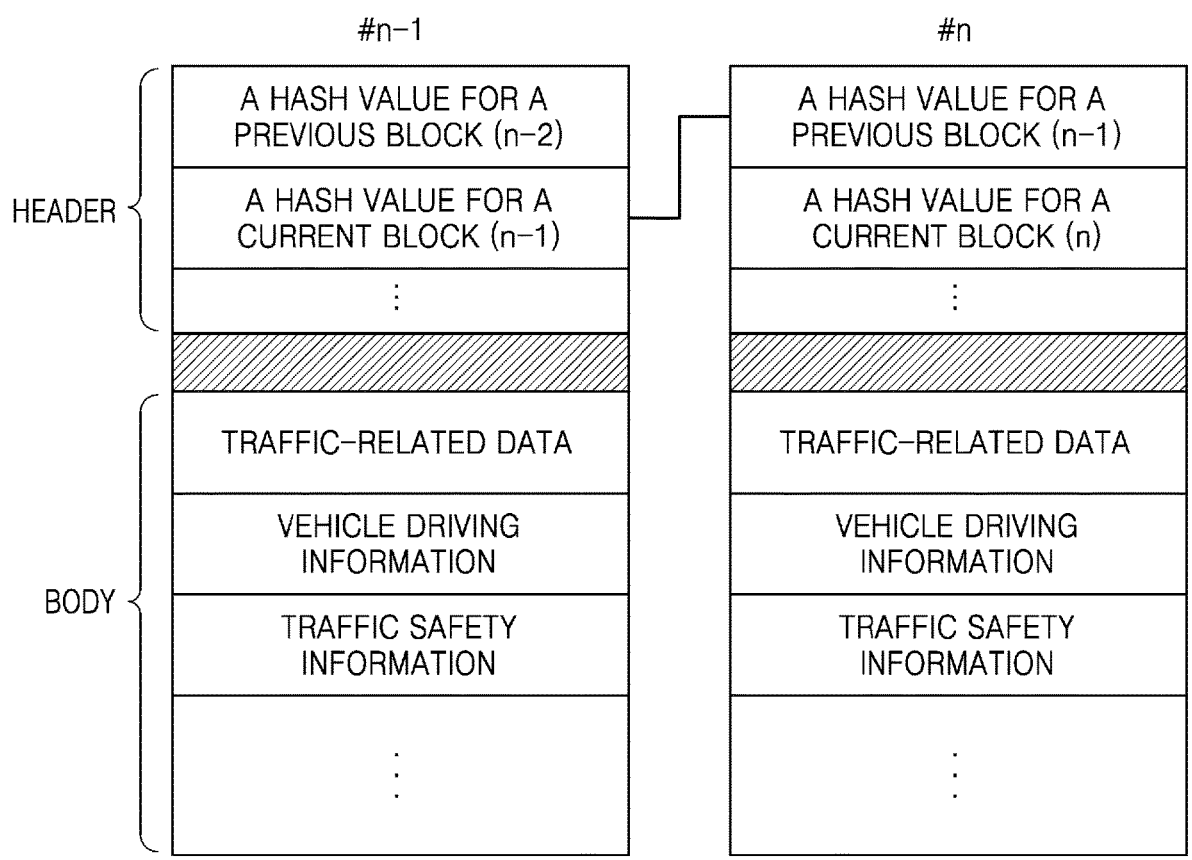
FIG. 2 is a diagram showing the configurations of blocks in which traffic-related data or the like is stored according to an embodiment.

A method by which traffic-related data is stored in a blockchain network is described in brief as follows. FIG. 2 is a diagram showing the configurations of blocks in which traffic-related data or the like is stored according to an embodiment.

Digitized information may be distributed and stored in a blockchain network. Each block, which is each of the basic units constituting the blockchain network, includes a header and a body.

Referring to FIG. 2, traffic-related data is stored in the body of a block. In addition to the traffic-related data, vehicle driving information and/or traffic safety information may be stored in the body of the block.

In the header of the block, a hash value for a previous block and a hash value for a corresponding block are stored. A hash value for a block refers to a hash value obtained by converting data, included in the body of the block, using a predetermined hash function. The hash value for the corresponding block is stored as a 'hash value for the previous block' in the header of a subsequent block, so that the blocks are connected to each other. In addition, values such as version and nonce values may be stored in the header of the block. Since this is related with general blockchain technology, a detailed description thereof will be omitted.

The blocks generated in the above-described way are distributed and stored in nodes constituting parts of the blockchain network, and a hash value for a specific block is stored in both the header of the corresponding block and the header of a subsequent block. Accordingly, reliability between distributed and stored data may be ensured.

Figure 3:
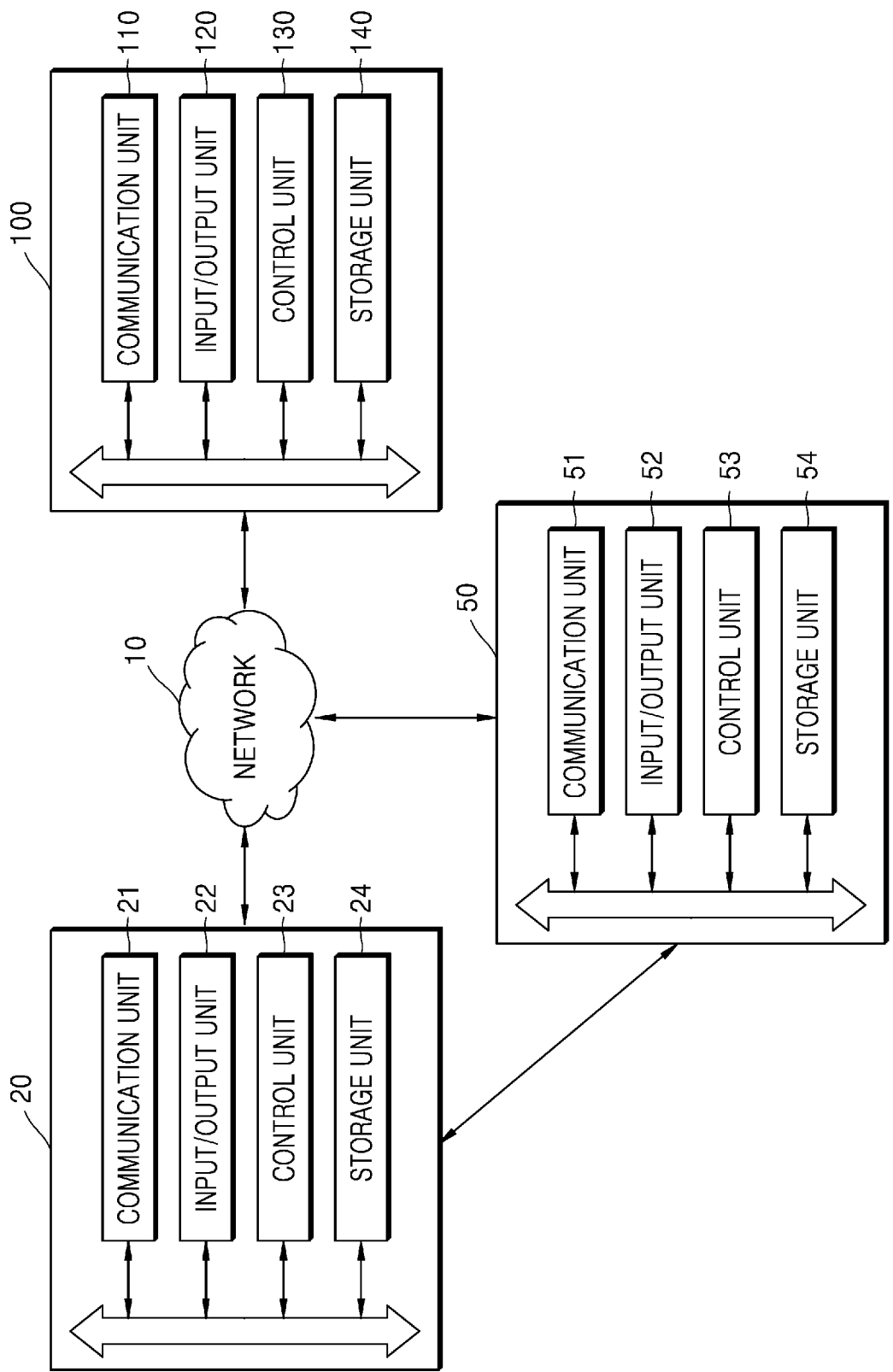
FIG. 3 is a diagram showing the configurations of an RSU (20), a user terminal (50), and a server (100) included in the traffic management system based on a blockchain according to an embodiment.

FIG. 3 is a diagram showing the configurations of the RSU 20, the user terminal 50, and the server 100 included in the traffic management system based on a blockchain according to an embodiment.

Referring to FIG. 3, the RSU 20, the user terminal 50, and the server 100 all include the same components. Accordingly, features common to the individual components will be described once below. Each of the RSU 20, the user terminal 50, and the server 100 may further include other components in addition to the components shown in FIG. 3, and may not include some of the components shown in FIG. 3.

Communication units 21, 51, and 110 are components that perform wired/wireless communication with other devices. To this end, each of the communication units 21, 51, and 100 may be composed of a chipset configured to support various types of wired/wireless communication protocols. The RSU 20, the user terminal 50, and the server 100 may transmit and receive data to and from each other through the communication units 21, 51, and 100.

Input/output units 22, 52, and 120 are components that receive data and commands and output results obtained by performing operation processing on the data according to the commands. Each of the input/output units 22, 52, and 120 may include input components such as a keyboard, hard buttons, and a touch screen, and output components such as LCDs, and OLEDs.

The user terminal 50 may display traffic-related data and traffic safety data on a screen through the input/output unit 52, and may also display details of a reward provided to a user.

Control units 23, 53, and 130 are components each of which includes at least one processor such as a CPU and controls the overall operation of a corresponding one of the devices 20, 50, and 100. By executing the program stored in the storage unit 24, 54, or 140, the control unit 23, 53, or 130 may perform the operation of collecting and transmitting traffic-related data and vehicle driving information, may perform the operation of storing them in the blockchain network, or may perform the operation of generating traffic safety information according to results obtained by analyzing traffic-related data. A process in which the control units 23, 53, and 100 collect traffic-related data, store it in the blockchain network, and provide feedback based on the collected data will be described in detail for each embodiment below. In the following description, operations performed by the control units 23, 53, and 130 of the respective devices 20, 50, and 100 may be described as being performed by the corresponding devices 20, 50, and 100 for convenience of description.

Storage units 24, 54, and 140 are components that store files and programs, and may be composed of various types of memories. In particular, data and programs adapted to enable the control units 23, 53, and 130 to perform operations according to embodiments to be described below may be stored in the storage units 24, 54, and 140.

Operations performed in a traffic management system based on a blockchain according to an embodiment will be described separately for each embodiment below.

1. Embodiment of Storing Vehicle Driving Information in a Blockchain Network and Providing a Reward Based on the Vehicle Driving Information The traffic management system based on a blockchain according to the embodiment may collect vehicle driving information, may store it in a blockchain network, and may provide a reward to a user based on the stored vehicle driving information.

In the present embodiment, the DTG installed in the vehicle 40 may be included in the user terminal 50 having a wide scope, and the user terminal 50 such as a smartphone may be implemented to perform the function of the conventional DTG. Accordingly, the following description of the present embodiment will be given on the assumption that the 'user terminal 50' includes the DTG.

The user terminal 50 collects vehicle driving information, generates a block including the vehicle driving information (hereinafter referred to as the 'driving information block'), and stores the block in the blockchain network. In this case, the server 100 may help to generate the block, may receive the generated block, and may store the received, generated block in the blockchain network.

The user terminal 50 may periodically collect vehicle driving information. In addition to the information described above, the vehicle driving information may further include shock event information generated when a vehicle shock is detected, abnormality event information generated when the failure of a vehicle occurs, and dangerous driving event information generated upon speeding, a sudden start, or a sudden stop.

The user terminal 50 or the server 100 may extract data such as accident-prone areas, per-time span safe driving areas, and driver characteristics by analyzing the vehicle driving information, and may perform evaluation and the provision of a reward for the safe driving of the vehicle 40 based on the extracted data.

According to an embodiment, in order for the user terminal 50 to generate a driving information block, the server 100 may transmit block generation permission information (e.g., a registration key) to the user terminal 50, in which case the server 100 may generate and transmit unique block generation permission information for each user terminal 50. The server 100 may manage information on the user terminal 50 generating a block by using the block generation permission information.

The user terminal 50 may encrypt the vehicle driving information by using the block generation permission information received from the server 100, and may generate a driving information block. In this way, the vehicle driving information is encrypted, transmitted, and stored, and thus the forgery and falsification of information may be prevented.

A driving information block may include a hash value for each of the block number of the corresponding block, vehicle driving information, and block generation permission information, and may include both a hash value for a previous block and a hash value for the corresponding block. The process of obtaining the hash value for the corresponding block is now described. A hash value obtained by applying the hash values (hash values for each of the previous block, the block number, the vehicle driving information, and the block generation permission information), included in the block, as input to a hash function becomes the hash value for the corresponding block. In this case, the 'block number' is a value indicating the sequential position at which the corresponding block was generated. Since each driving information block is configured to include a hash value for the previous block, all blocks may be connected in the form of a blockchain, thereby effectively preventing the forgery and falsification of information.

The user terminal 50 may encrypt the vehicle driving information, the block generation permission information, and each driving information block by converting them into hash values using a hash function. In this case, the user terminal 50 may use Secure Hash Algorithm 1 (SHA1), which is a hash function having a relatively small computational load, so that the present embodiment can be smoothly performed even in a mobile terminal having relatively low computational power.

The user terminal 50 may generate a hash value for the current block by configuring the hash values, into which the vehicle driving information, the block generation permission information, and the block number have been converted, in the form of a Merkle tree. In detail, the user terminal 50 may obtain a new hash value (parent data for leaf data) by first obtaining hash values (the leaf data) corresponding to the vehicle driving information, the block generation permission information, and the block number and then concatenating the obtained hash values and the hash values for the previous block in pairs. The user terminal 50 may repeat the above process until it can no longer pair two hash values, i.e., until only one hash value remains, and, finally, may store one remaining hash value (a Merkle tree root) in the header of the block. In this case, the Merkle tree root becomes a hash value for the current block, which may be used to generate a subsequent block. Since the hash value for the current block is related to all the information included in the block, it can be used to determine whether the information is forged or falsified.

When generating a hash value corresponding to block generation permission information, the user terminal 50 may generate the hash value using random information obtained by converting seed information received from the server 100. In this case, the seed information may be a unique identifier assigned to the user terminal 50 by the server 100, and the user terminal 50 may generate random information by randomly converting the seed information as many times as the number of times corresponding to the block number of a driving information block to be generated. In this case, it is assumed that when specific seed information is randomly converted a specific number of times, random information having the same value is always generated. According to the assumption, for example, random information generated by randomly converting the seed information '100' twice is always '45.'

The user terminal 50 may generate a hash value corresponding to the block generation permission information by using the block generation permission information and the random information. Since the random information is used to generate the hash value as described above, security may be improved and the possibility of blocking the forgery and falsification of information may be increased.

The user terminal 50 may transmit the generated driving information block to the server 100 over the network 10. Once the user terminal 50 has received block generation permission information from the server 100, the user terminal 50 may generate a driving information block even in the state in which it is not connected to the network 10 or the server 100. The user terminal 50 may transmit blocks, generated in a disconnected state, to the server 100 after the connection with the server 100 is resumed.

According to an embodiment, the user terminal 50 may generate reward information based on vehicle driving information included in each driving information block, and may transmit it to the server 100. In this case, the 'reward information' refers to information about the type and quantity of reward provided to a user who has operated the vehicle 40. For example, the user terminal 50 may determine the number of times speeding is performed, the number of sudden starts or sudden stops, and whether a shock is imposed to a vehicle by analyzing the vehicle driving information, may calculate a safe driving index by taking into consideration them in an integrated manner, and may generate reward information according to the calculated safe driving index. The server 100 may transmit a reward based on the received reward information to the user terminal 50. For example, the server 100 may transmit cryptocurrency or an electronic voucher to the user terminal 50 as a reward. In this way, a reward is provided for safe driving, and thus the user may be motivated to safely operate the vehicle 40.

Although the user terminal 50 has been described as generating the driving information block and the reward information in the above embodiment, the present invention is not limited thereto, but the server 100 may also generate the driving information block and the reward information. In other words, the server 100 may receive vehicle driving information from the user terminal 50, and may generate a driving information block by using block generation permission information for the user terminal 50. Furthermore, the server 100 may generate reward information based on vehicle driving information received from the user terminal 50 or included in a directly generated driving information block.

According to an embodiment, a user may input vehicle driving information or additional information related thereto through the input/output unit 52 of the user terminal 50. For example, when generating shock event information, the user may input information about a detailed reason for a vehicle shock or the situation of a vehicle shock through a touch screen, and the input information may be transmitted to the server 100.

According to an embodiment, the user terminal 50 may vary an information collection period according to the type of information included in the vehicle driving information. For example, the user terminal 50 may measure and collect an accumulated mileage at daily intervals, and may measure and collect the speed of the vehicle at the intervals of one second.

According to an embodiment, the server 100 may determine whether the driving information block received from the user terminal 50 has been forged or falsified. In detail, the server 100 generates a hash value for a current block by combining block generation permission information corresponding to the user terminal 50 having transmitted the corresponding driving information block, a block number, and seed information. Based on the generated hash value, it may be determined whether the block has been forged or falsified.

Figure 4:
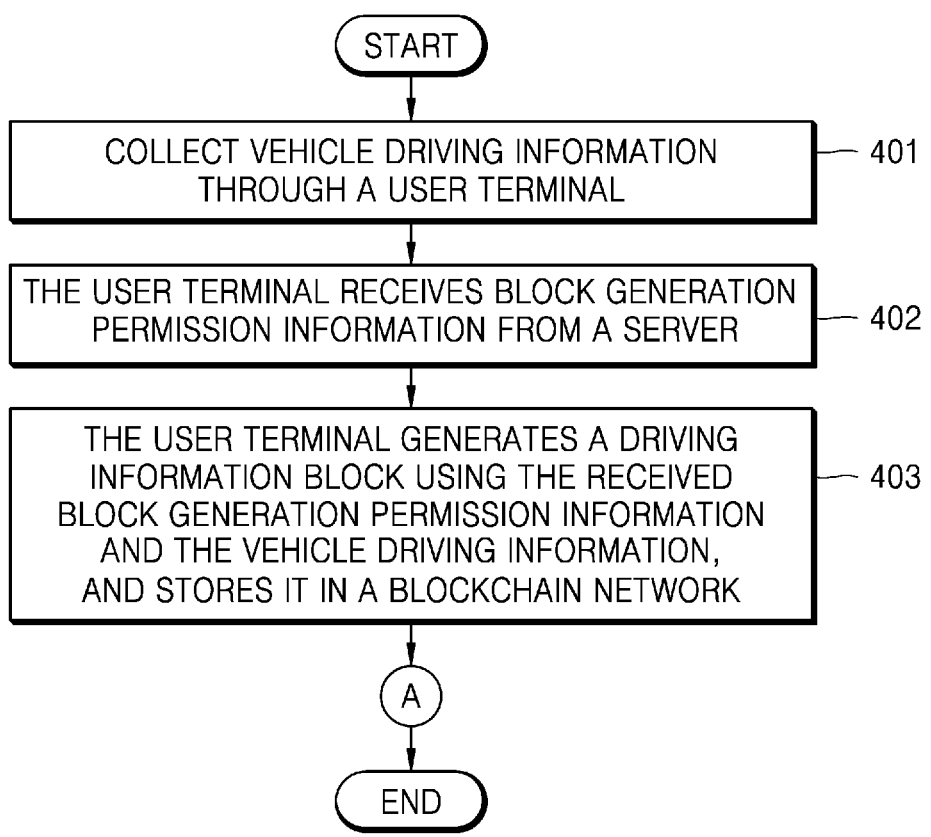
FIGS. 4 to 6 are flowcharts illustrating an embodiment in which a traffic management system based on a blockchain according to an embodiment stores vehicle driving information in a blockchain network and provides a reward based on the vehicle driving information.
Figure 5:
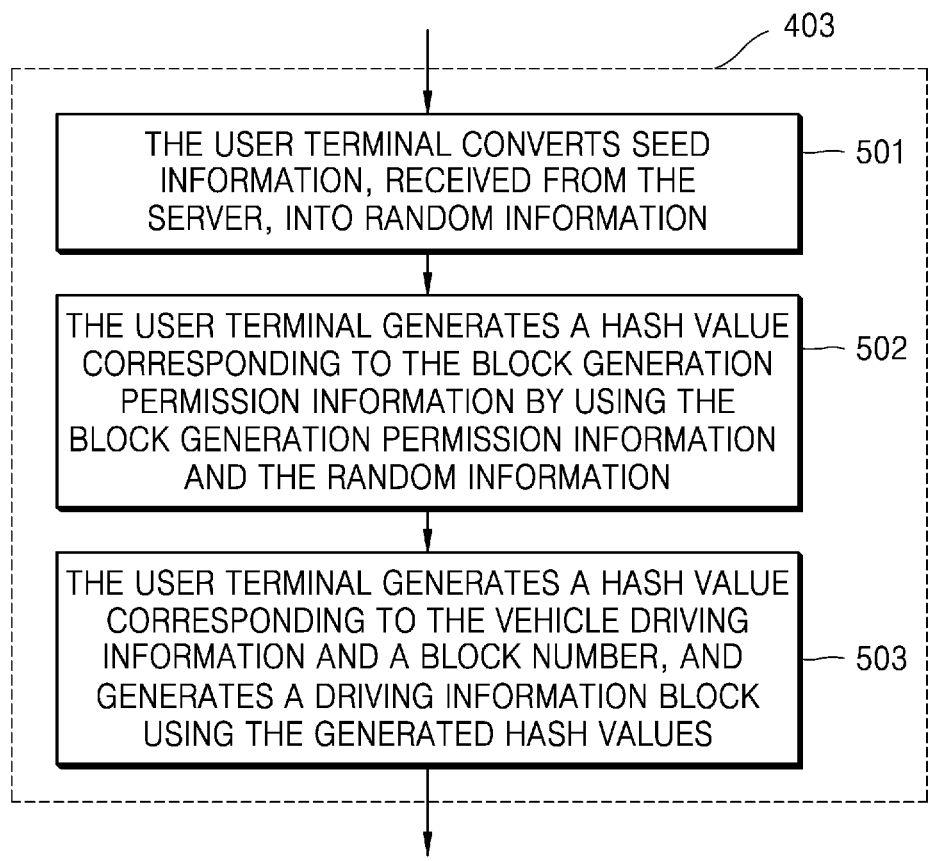
Figure 6:
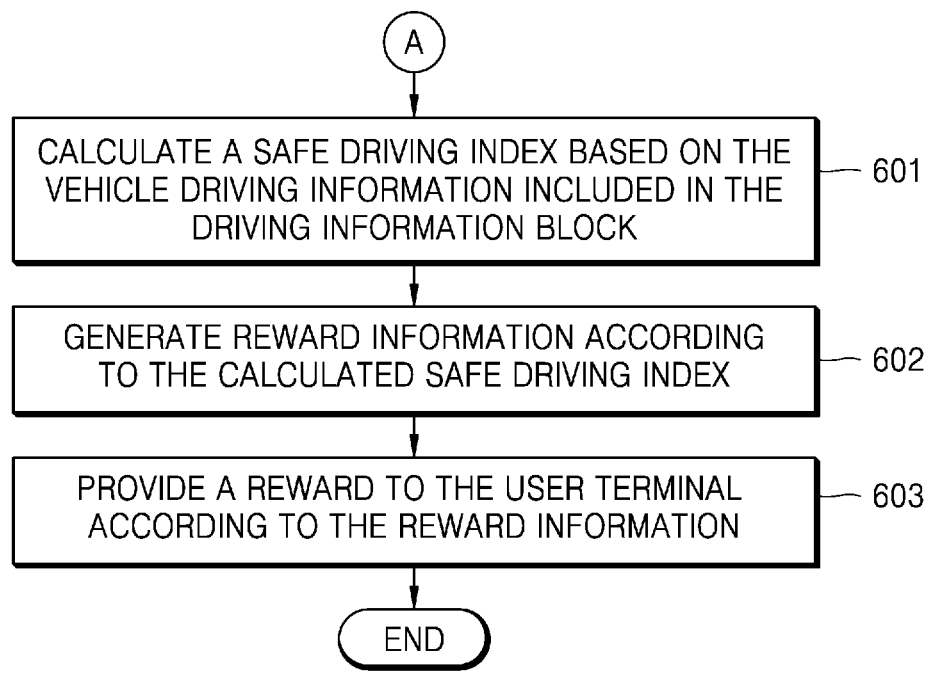

FIGS. 4 to 6 are flowcharts illustrating an embodiment in which a traffic management system based on a blockchain according to an embodiment stores vehicle driving information in a blockchain network and provides a reward based on the vehicle driving information.

Referring to FIG. 4, vehicle driving information is collected through the user terminal 50 at step 401. At step 402, the user terminal 50 receives block generation permission information from the server 100. At step 403, the user terminal 50 generates a driving information block using the received block generation permission information and the vehicle driving information, and stores it in the blockchain network.

FIG. 5 shows detailed steps included in step 403 of FIG. 4. Referring to FIG. 5, at step 501, the user terminal 50 converts seed information, received from the server 100, into random information. At step 502, the user terminal 50 generates a hash value corresponding to the block generation permission information by using the block generation permission information and the random information. At step 503, the user terminal 50 generates a hash value corresponding to the vehicle driving information and a block number, and generates a driving information block using the generated hash values.

FIG. 6 shows steps performed following step 403 of FIG. 4. Referring to FIG. 6, the user terminal 50 calculates a safe driving index based on the vehicle driving information included in the driving information block. At step 602, the user terminal 50 generates reward information according to the calculated safe driving index, and transmits it to the server 100. At step 603, the server 100 provides a reward to the user terminal according to the reward information.

Meanwhile, although the detailed process of storing the vehicle driving information in the blockchain network has been described in the present embodiment, a similar process may be performed when traffic-related data or traffic safety information is stored in the blockchain network.

According to the present embodiment, the vehicle driving information is stored in the blockchain network, and thus a user is prevented from freely forging or falsifying the vehicle driving information. Furthermore, according to the present embodiment, it is determined whether the user has safely driven the vehicle based on the vehicle driving information, and a reward is provided to the user according to the results of the determination, thereby motivating the user to drive safely.

2. Embodiment of Generating Traffic Safety Information Based on Traffic-Related Data and Determining and Providing Guidance on a Traffic Safety Action Corresponding to the Traffic Safety Information A traffic management system based on a blockchain according to an embodiment may generate traffic safety information based on traffic-related data stored in a blockchain network, may determine an appropriate action to maintain traffic safety according to the generated traffic safety information, and may also provide guidance to a user. In addition, the traffic management system based on the blockchain according to the embodiment may provide a corresponding reward to the user when the user performs the appropriate action to maintain traffic safety.

The RSU 20 or the server 100 may generate traffic safety information by analyzing road conditions around the vehicle 40 or conditions around the RSU 20 based on traffic-related data recorded in the blockchain network. For example, the traffic safety information may include information in which a road ahead is congested, information in which a danger factor (e.g., a construction section) is present on a road ahead, and/or information in which a road ahead is foggy. The RSU 20 or the server 100 may generate traffic safety information by analyzing a photographed image of the road or analyzing the locations and speeds of vehicles.

Furthermore, the RSU 20 or the server 100 may determine an appropriate action for the maintenance of traffic safety (hereinafter referred to as the 'traffic safety action') according to the traffic safety information. For example, if the traffic safety information includes information in which the road ahead is congested, the RSU 20 or the server 100 may determine 'entering the bypass road' or 'decelerating the vehicle' to be a traffic safety action. Alternatively, for example, if the traffic safety information includes information in which there is a danger factor on the road ahead, the RSU 20 or the server 100 may determine 'entering the bypass road,' 'changing the lane' or 'decelerating the vehicle' to be a traffic safety action. Alternatively, for example, if the traffic safety information includes information in which the road ahead is foggy, the RSU 20 or the server 100 may determine 'decelerating the vehicle' to be a traffic safety action. The traffic safety actions generated in this way may also be stored in the blockchain network.

The traffic safety action may be determined differently for each user. For example, if the driving experience of the user driving the specific vehicle 40 is short or the user is old, the RSU 20 or the server 100 may determine 'entering the detour road' to be a traffic safety action when there is a sharp curve in front of the vehicle 40. To this end, information related to each user's identity, such as the user's age and driving history, may be included in the traffic-related data.

The RSU 20 or the server 100 may take into consideration the location of the RSU 20 having contributed to the collection and storage of traffic-related data when determining traffic safety information and a traffic safety action based on traffic-related data. To this end, when the RSU 20 stores traffic-related data in the blockchain network, it may also store the location information of the RSU 20.

Figure 7:
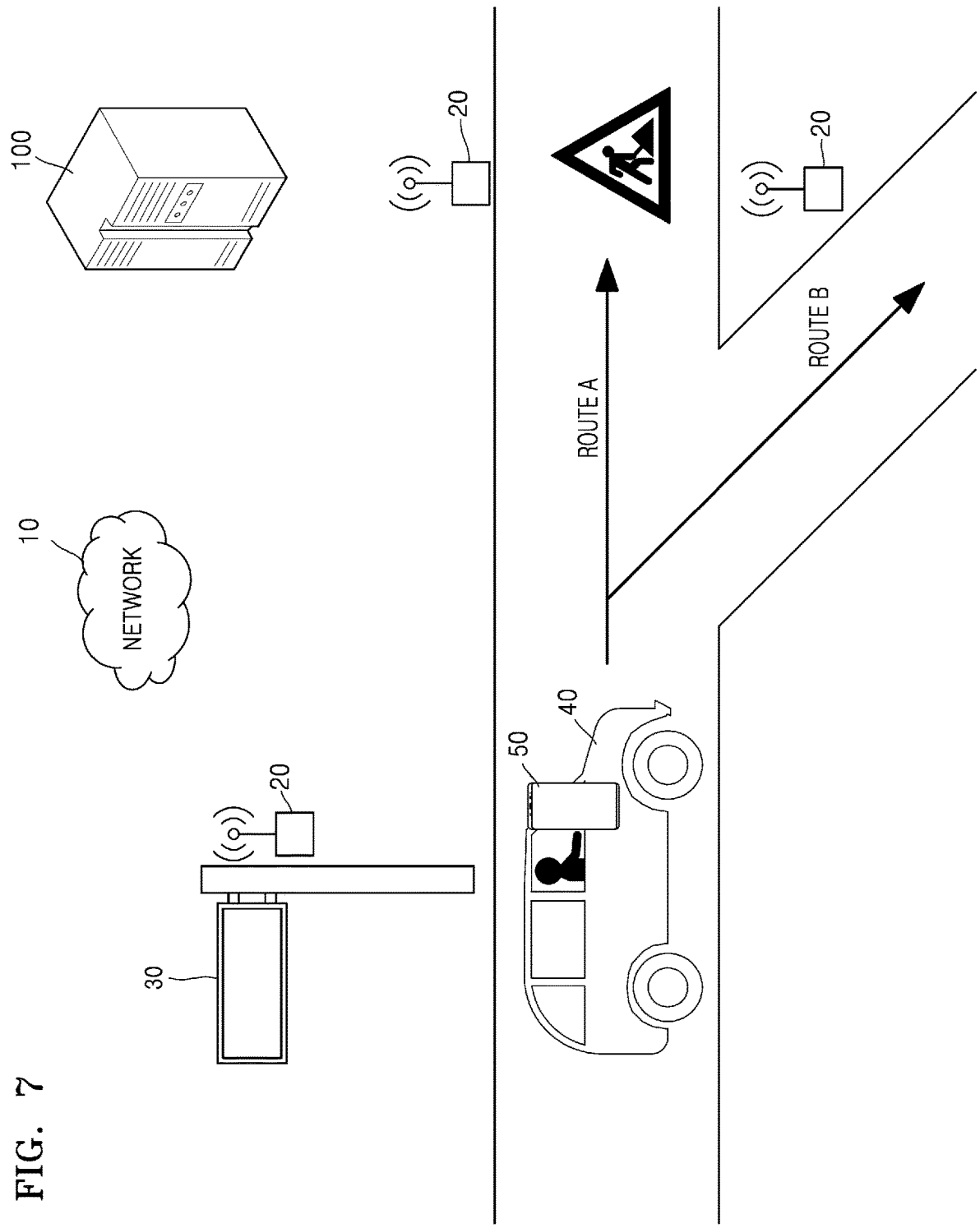
FIG. 7 is a diagram illustrating a process in which a traffic management system based on a blockchain according to an embodiment determines a traffic safety action based on traffic-related data.

A specific example in which the RSU 20 or the server 100 determines a traffic safety action will be described with reference to FIG. 7 as follows. FIG. 7 is a diagram illustrating a process in which a traffic management system based on a blockchain according to an embodiment determines a traffic safety action based on traffic-related data.

Referring to FIG. 7, construction is in progress on a road in front of the vehicle 40. The RSU 20 around an area under construction collects an image photographed by a camera as traffic-related data. Based on this, the RSU 20 or the server 100 may generate traffic safety information indicating that a dangerous element is present on a road.

The RSU 20 or the server 100 may determine 'entering the bypass road' to be a traffic safety action according to the above-described traffic safety information. In this case, the RSU 20 or the server 100 may receive information about the destination and planned route of the vehicle 40 from the user terminal 50, may determine a detour route based thereon, and may provide guidance to the user. For example, when information in which the planned route of the vehicle 40 is route A is received, the RSU 20 or the server 100 may display information indicative of 'entering the detour route' on the user terminal 50 while guiding the user through the detour route to a destination via route B.

In this case, the RSU 20 or the server 100 selects a target for the provision of guidance on traffic safety information and a traffic safety action based on the identification information and location information of the user terminal 50 or the vehicle 40 included in traffic-related data. For example, when the location of a construction section is determined based on the location information of the RSU 20 having photographed a road under construction and it is determined that the vehicle 40 is located close to the construction section based on the corresponding location information of the user terminal 50 or the vehicle 40, the corresponding vehicle 40 may be selected as a target for the provision of guidance on traffic safety information and a traffic safety action related to the construction section.

The RSU 20 or the server 100 may determine traffic safety information and a traffic safety action corresponding to the specific user terminal 50 or the vehicle based on the identification information and location information of the user terminal 50 or the vehicle 40 included in the traffic-related data. For example, the RSU 20 or the server 100 may determine that traffic safety information about a road within a predetermined distance from the user terminal 50 or the vehicle 40 and a corresponding traffic safety action correspond to the user terminal 50 or the vehicle 40. The RSU 20 or the server 100 may transmit the generated traffic safety information and traffic safety action to the corresponding user terminal 50, and the user may check the traffic safety information and the traffic safety action displayed through the input/output unit 52 of the user terminal 50.

Alternatively, the RSU 20 or the server 100 determines that traffic safety information and a traffic safety action determined based on traffic-related data collected by the specific RSU 20 correspond to the corresponding RSU 20, and may provide guidance on the traffic safety information and the traffic safety action to the user terminal 50 or the vehicle 40 located within a predetermined distance from the corresponding RSU 20.

When it is determined that the vehicle 40 has performed the corresponding traffic safety action, the RSU 20 or the server 100 may provide a reward to the corresponding vehicle 40 or the user terminal 50 corresponding to the corresponding vehicle 40.

Alternatively, when it is determined that the vehicle 40 located within a predetermined distance from the specific RSU 20 has performed a traffic safety action corresponding to the RSU 20, the RSU 20 or the server 100 may provide a reward to the corresponding vehicle 40 or the user terminal 50 corresponding to the corresponding vehicle 40.

Referring to FIG. 7, when the vehicle 40 detours to the route B according to the traffic safety action, the RSU 20 or the server 100 may provide a reward to the user terminal 50 or the vehicle 40. In this case, the RSU 20 or the server 100 may determine that the vehicle 40 has entered the route B based on the location information of the user terminal 50 or the vehicle 40. Alternatively, the RSU 20 or the server 100 determines that the vehicle 40 has entered the route B when the RSU 20 around the route B communicates with the user terminal 50 or the vehicle 40.

When the RSU 20 is connected to and installed on the VMS 30, traffic safety information and a traffic safety action corresponding to the corresponding RSU 20 may be displayed through the VMS 30.

The traffic safety information and the traffic safety action have been described as having the possibility of being displayed through the input/output unit 52 of the user terminal 50. In this case, the user terminal 50 may provide a game having a mission to achieve a traffic safety action in order to arouse a user's interest and increase participation. This will be described with reference to FIG. 8.

Figure 8:
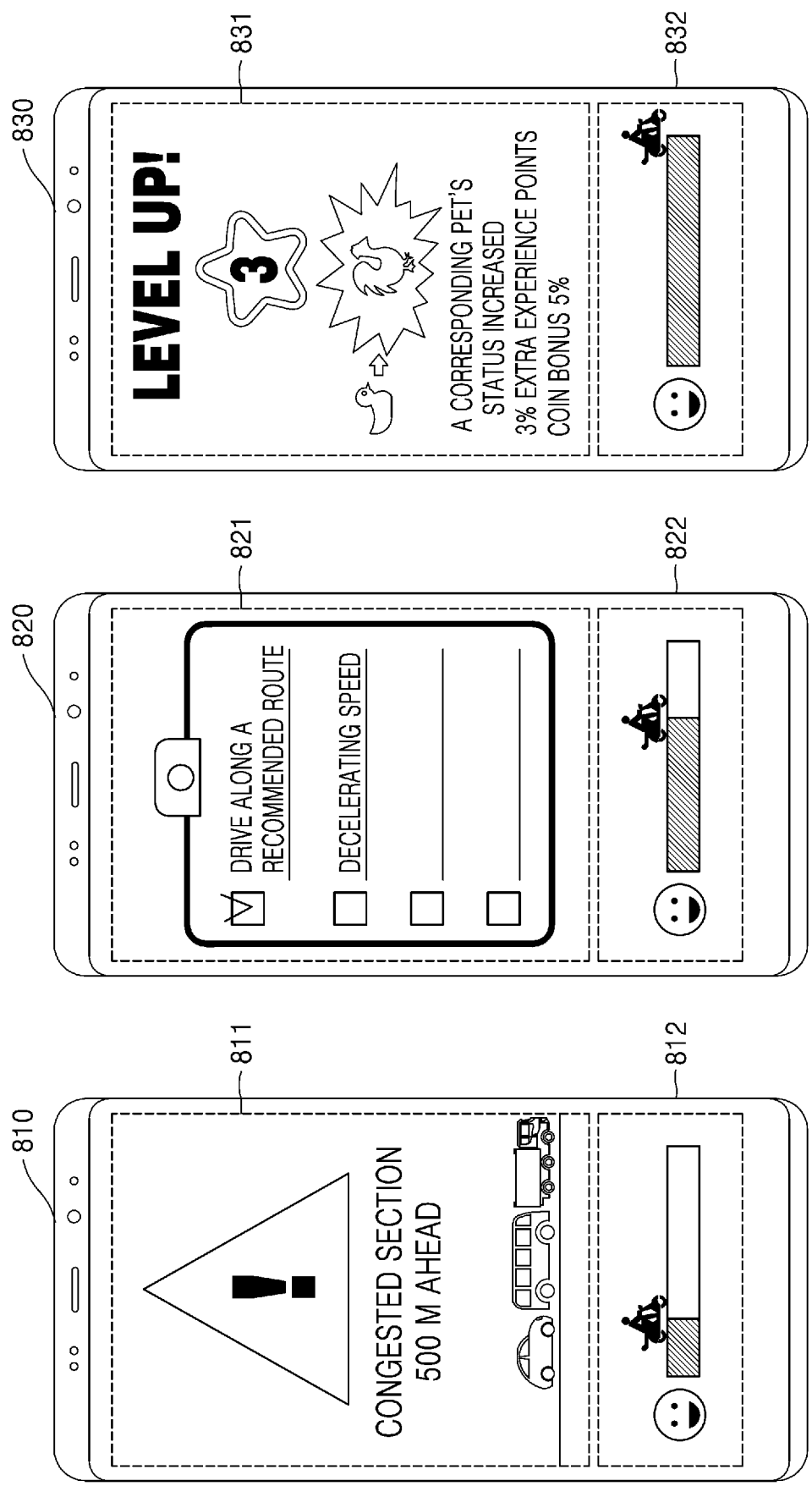
FIG. 8 is a diagram illustrating a user interface (UI) screen in which traffic safety information and a traffic safety action are displayed through a user terminal in a traffic management system based on a blockchain according to an embodiment.

FIG. 8 is a diagram illustrating a user interface (UI) screen in which traffic safety information and a traffic safety action are displayed through a user terminal in a traffic management system based on a blockchain according to an embodiment.

Referring to FIG. 8, traffic safety information indicating that construction is in progress on a road ahead is displayed in the first-first area 811 of a first screen 810. A target gauge, which increases whenever the user performs a traffic safety action, is displayed in the first-second area 812 of the first screen 810.

A traffic guidance action determined by the RSU 20 or the server 100 is displayed in the second-first area 821 of the second screen 820. As shown in FIG. 8, a plurality of traffic guidance actions may be displayed at the same time, in which case the plurality of traffic guidance actions may be sequentially displayed according to priority. The priorities of the traffic guidance actions may be determined according to a preset criterion or algorithm. A user may select any one of the plurality of traffic guidance actions displayed in the second-first area 821, and may drive the vehicle 40 to perform the selected traffic guidance action.

As described above, the target gauge displayed in the first-second area 812 may be accumulated and increased whenever the user performs the traffic safety action. The game may be configured in such a manner that a level is upgraded when the target gauge is full. According to an embodiment, the game may be configured such that a pet grows when the target gauge is full. In FIG. 8, when the target gauge displayed in the third-second area 832 of the third screen 830 is all full, a graphic indicating that the pet has grown, together with guidance indicating that the level has been increased, may be displayed in the third-first area 831. In addition, the RSU 20 or the server 100 may provide an additional reward to the user when the user fills the target gauge. Guidance on an additional reward is displayed in the third-first area 831.

Figure 9:
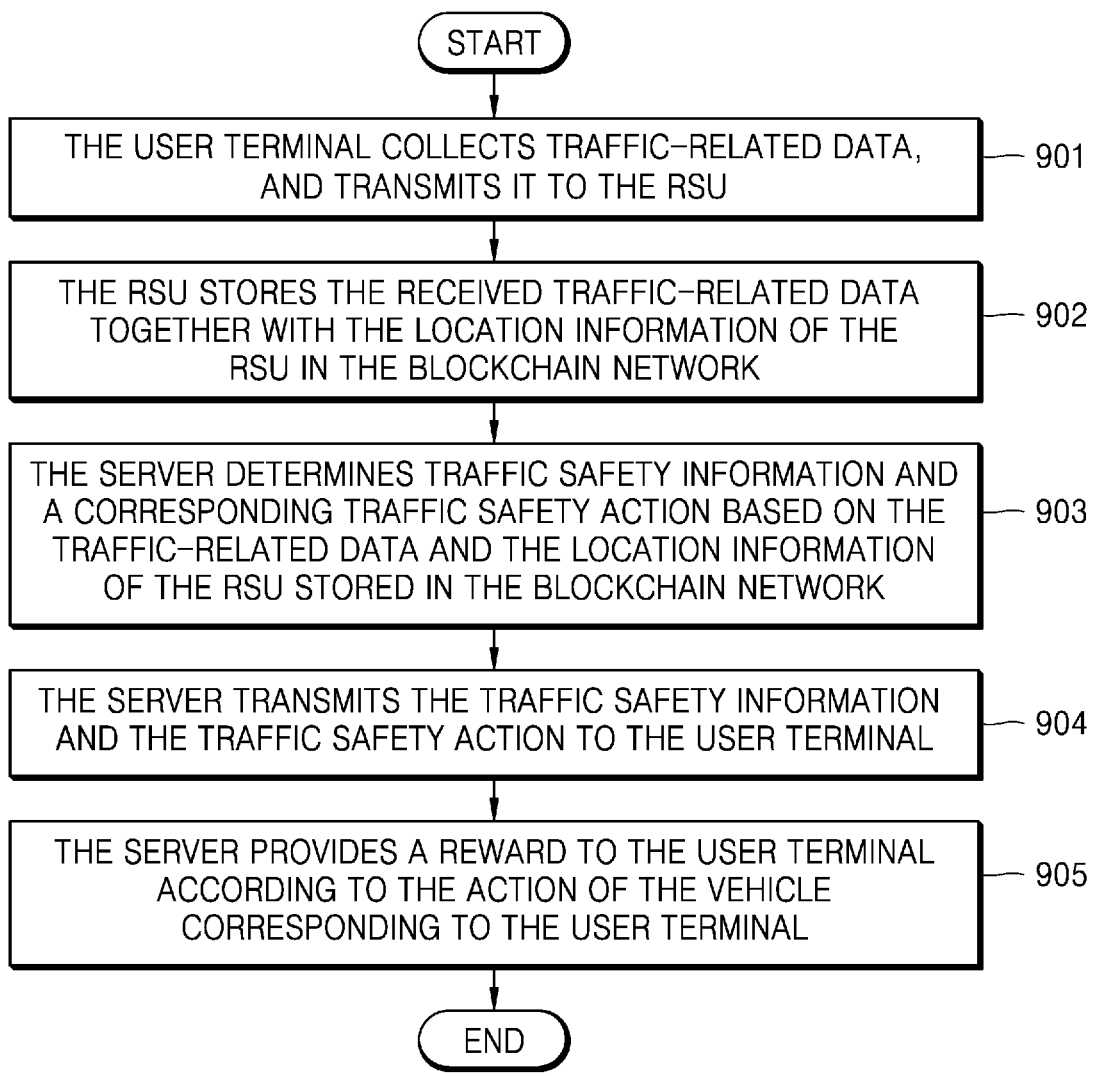
FIG. 9 is a flowchart illustrating an embodiment in which a traffic management system based on a blockchain according to an embodiment determines a traffic safety action and provides a reward.

FIG. 9 is a flowchart illustrating an embodiment in which a traffic management system based on a blockchain according to an embodiment determines a traffic safety action and provides a reward.

Referring to FIG. 9, at step 901, the user terminal 50 collects traffic-related data and transmits it to the RSU 20. At step 902, the RSU 20 stores the received traffic-related data together with the location information of the RSU 20 in the blockchain network. At step 903, the server 100 determines traffic safety information and a corresponding traffic safety action based on the traffic-related data and the location information of the RSU stored in the blockchain network. At step 904, the server 100 transmits the traffic safety information and the traffic safety action to the user terminal 50. At step 905, the server 100 provides a reward to the user terminal 50 according to the action of the vehicle 40 corresponding to the user terminal 50.

As described in this embodiment, the RSU 20 or the server 100 may determine traffic safety information and a traffic safety action based on traffic-related data stored in the blockchain network and provide guidance on the traffic safety information and the traffic safety action to the user, thereby allowing the user to easily identify a dangerous situation and immediately become aware of appropriate countermeasures for it. In addition, the RSU 20 or the server 100 may provide a reward when the user performs a traffic safety action, thereby motivating the user to drive a vehicle in a desired manner.

3. Embodiment of Recommending a Route for the Avoidance of Traffic Congestion Based on Traffic-Related Data and Providing a Reward when a User Selects the Recommended Route A traffic management system based on a blockchain according to an embodiment recommends a route according to a destination input by a user, in which case the traffic management system may provide a recommended route for the avoidance of traffic congestion based on traffic-related data stored in a blockchain network and provide a reward when the user drives a vehicle along the recommended route. The present embodiment will be described with reference to FIGS. 10 to 12 below.

Figure 10:
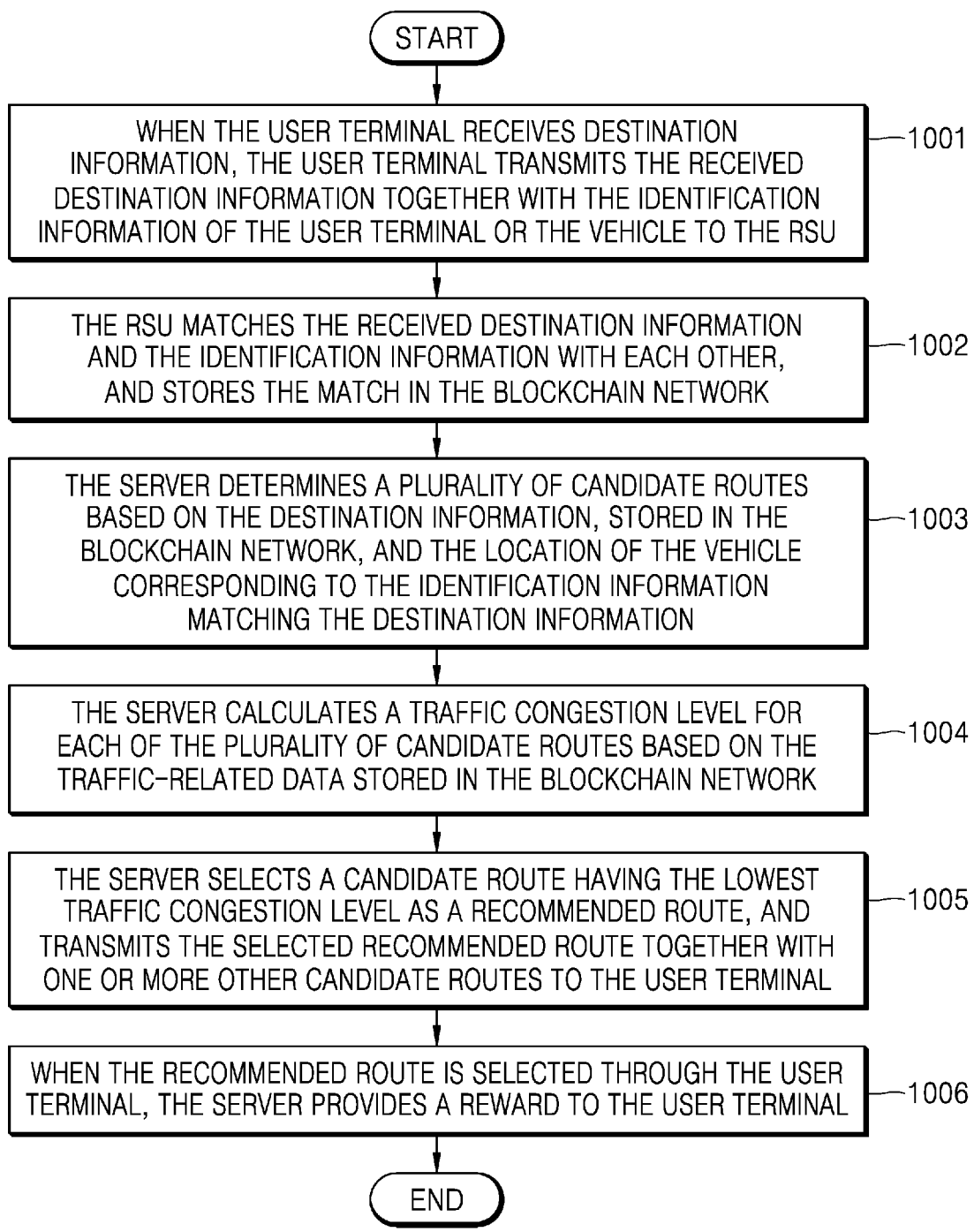
FIGS. 10 and 11 are flowcharts illustrating a method by which a traffic management system based on a blockchain according to an embodiment recommends a route and provides a reward for the selection of the route.
Figure 11:
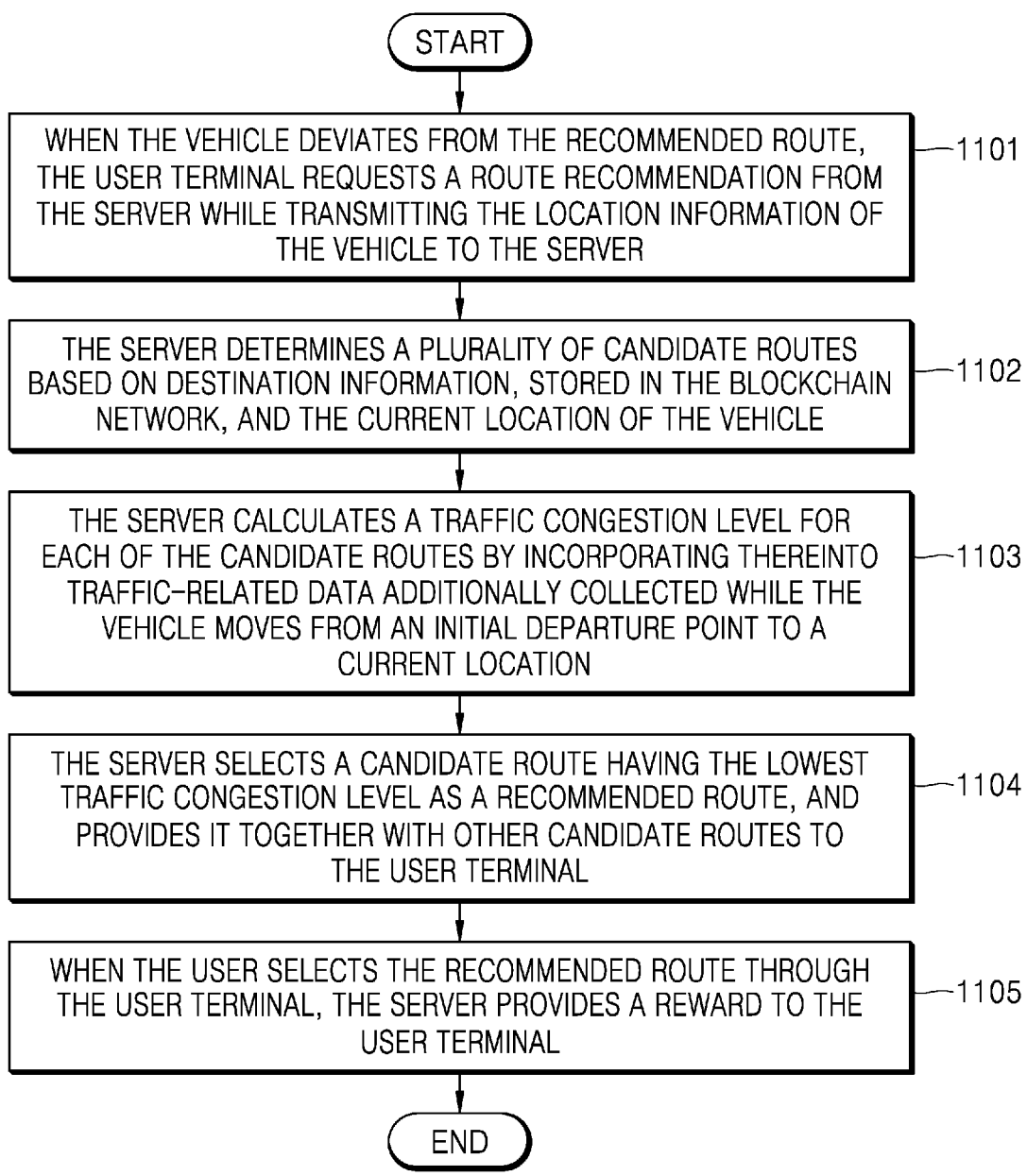

FIGS. 10 and 11 are flowcharts illustrating a method by which a traffic management system based on a blockchain according to an embodiment recommends a route and provides a reward for the selection of the route.

Referring to FIG. 10, at step 1001, when the user terminal 50 receives destination information from the user, the user terminal 50 transmits the received destination information together with the identification information (e.g., a vehicle number, a user name, a phone number, and/or the like) of the user terminal 50 or the vehicle 40 to the RSU 20.

At step 1002, the RSU 20 matches the received destination information and the identification information with each other, and stores the match in the blockchain network. As described above, traffic-related data collected through at least one of the user terminal 50, the vehicle 40, and the RSU 20 may also be stored in the blockchain network.

According to another embodiment, at step 1001, the user terminal 50 encrypts the identification information, stores it in the storage unit 54 of the user terminal 50, and transmits only a hash value for the encrypted information to the roadside device 20. At step 1002, the RSU 20 stores the received hash value in the blockchain network. In this way, the identification information including personal information may be safely stored in the user terminal, and also the reliability of the identification information may be ensured because it is proved by the hash value stored in the blockchain that the identification information is stored in the user terminal.

At step 1003, the server 100 may determine a plurality of candidate routes based on the destination information, stored in the blockchain network, and the location of the vehicle corresponding to the identification information matching the destination information.

At step 1004, the server 100 may calculate a traffic congestion level for each of the plurality of candidate routes based on the traffic-related data stored in the blockchain network. In this case, the traffic congestion level refers to a value representative of the degree of traffic congestion. The server 100 may calculate the traffic congestion level according to a pre-prepared algorithm based on the number and average speed of vehicles traveling on each of the candidate routes.

At step 1005, the server 100 selects a candidate route having the lowest traffic congestion level as a recommended route, and transmits the selected recommended route together with one or more other candidate routes to the user terminal 50.

At step 1006, when the user selects the recommended route through the user terminal 50, the server 100 provides a reward to the user terminal 50 or the vehicle 40.

The user is rewarded because it is recognized that he or she has contributed to mitigating traffic congestion by selecting the recommended route provided by the server 100. For example, among the candidate routes transmitted together with the recommended route to the user terminal 50 at step 1005, there may be a route having the shortest distance between a departure point and a destination or a route requiring the shortest time to arrive at a destination. When the user has selected the recommended route in spite of the above situation, it contributes to lowering traffic congestion on a road while incurring a loss in terms of fuel cost and time from the user's point of view, and thus the server 100 provides a reward therefor.

When the user selects the recommended route, drives the vehicle 40 and deviates from the recommended route, the user terminal 50 may request the server 100 to provide guidance on a new recommended route, and the server 100 may determine a new recommended route and transmit it to the user terminal 50. In this case, the server 100 may determine a new recommended route by incorporating thereinto traffic-related data additionally collected while the vehicle 40 moves from an initial departure point to a current location. The present embodiment will be described with reference to FIG. 11 below.

Referring to FIG. 11, at step 1101, when the user selects a recommended route and the vehicle 40 deviates from the recommended route, the user terminal 50 may request a route recommendation from the server 100 while transmitting the location information of the vehicle 40 to the server 100. In this case, whether the vehicle 40 deviates from the recommended route may be determined by comparing a location measured through the GPS function of the user terminal 50 with the recommended route, or may be determined by comparing the location of the roadside device 20, communicating with the user terminal 50 or the vehicle 40, with the recommended route.

At step 1102, the server 100 determines a plurality of candidate routes based on destination information corresponding to the user terminal 50, stored in the blockchain network, and the current location of the vehicle 40.

At step 1103, the server 100 calculates a traffic congestion level for each of the plurality of candidate routes. In this case, the server 100 may calculate a traffic congestion level by incorporating thereinto traffic-related data additionally collected while the vehicle 40 moves from an initial departure point to a current location.

At step 1104, the server 100 selects a candidate route having the lowest traffic congestion level as a recommended route, and transmits it together with other candidate routes to the user terminal 50.

At step 1105, when the user selects the recommended route through the user terminal 50, the server 100 provides a reward to the user terminal 50.

Figure 12:
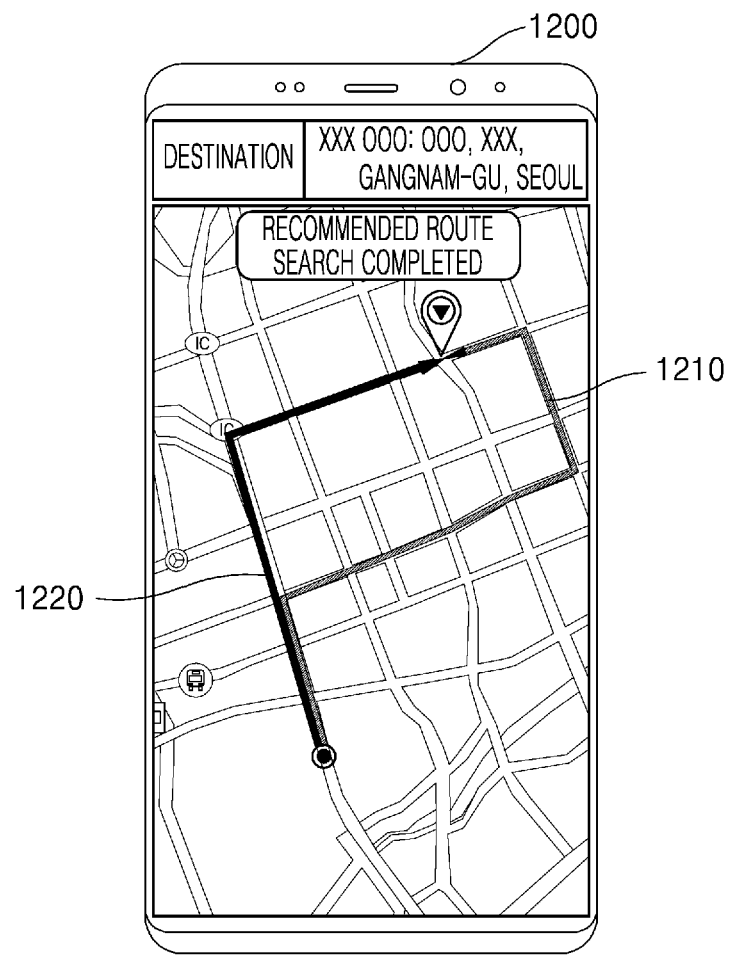
FIG. 12 is a diagram showing a state in which a route recommended by a traffic management system based on a blockchain according to an embodiment by taking into consideration traffic congestion is displayed on a user terminal.

FIG. 12 is a diagram showing a state in which a route recommended by a traffic management system based on a blockchain according to an embodiment by taking into consideration traffic congestion is displayed on a user terminal.

Referring to FIG. 12, two routes 1210 and 1220 are displayed on a screen 1200 displayed on the user terminal 50. It is assumed that the first route 1210 is a recommended route determined by taking into consideration traffic congestion, and the second route 1220 is the shortest route. In other words, it is assumed that the second route 1220 is congested because there are many vehicles on the second route 1220 and the first route 1210 is a route having the lowest traffic congestion level among multiple routes from a departure point to a destination.

From the user's point of view, when he or she selects the second path 1220, fuel costs may be saved or it may take less time to travel along the second route 1220 than to travel along the first path 1210. However, when the user contributes to preventing traffic congestion by selecting the first route 1210 while taking such a loss, the server 100 may provide a reward to the user terminal 50.

The term 'unit' used in the above-described embodiments means software or a hardware component such as a field-programmable gate array (FPGA) or application-specific integrated circuit (ASIC), and a 'unit' performs a specific role. However, a 'unit' is not limited to software or hardware. A 'unit' may be configured to be present in an addressable storage medium, and also may be configured to run one or more processors. Accordingly, as an example, a 'unit' includes components, such as software components, object-oriented software components, class components and task components, processes, functions, attributes, procedures, subroutines, segments in program code, drivers, firmware, microcode, circuits, data, a database, data structures, tables, arrays, and variables.

Each of the functions provided in components and 'unit(s)' may be coupled to a smaller number of components and 'unit(s)' or divided into a larger number of components and 'unit(s).'

In addition, components and 'unit(s)' may be implemented to run one or more CPUs in a device or secure multimedia card.

The traffic management method based on a blockchain network according to each of the above-described embodiments may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the traffic management method based on a blockchain network according to each of the above-described embodiments may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the traffic management method based on a blockchain network according to each of the above-described embodiments may be implemented in such a manner that the above-described computer program is executed by a computing device. The computing device may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing device. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued via the present specification should be defined by the attached claims, rather than the detailed description. All modifications and variations which can be derived from the meanings, scopes and equivalents of the claims should be construed as falling within the scope of the present invention.

The invention claimed is:

1. A traffic management method based on a blockchain network, the traffic management method comprising:
    collecting traffic-related data through at least one of a vehicle, a user terminal corresponding to the vehicle, and a roadside unit (RSU);
    collecting vehicle driving information through at least one of the vehicle and the user terminal;
    transmitting, by a server, block generation permission information to the user terminal;
    transmitting, by the server, seed information to the user terminal;
    storing, by at least one of the user terminal, the RSU and the server, the traffic-related data and the vehicle driving information in the blockchain network;
    providing, by the server, feedback to the user terminal based on the traffic-related data stored in the blockchain network; and
    calculating a safe driving index, which is a criterion for determining whether a user has safely driven the vehicle, based on the vehicle driving information stored in the blockchain network and providing a reward to the user terminal based on the safe driving index,
    wherein the storing the traffic-related data and the vehicle driving information in the blockchain network comprises:
        encrypting, by the user terminal, the traffic-related data;
        storing, by the user terminal, the encrypted traffic-related data and a first hash value corresponding to the encrypted traffic-related data in the user terminal and transmitting the first hash value to the server;
        storing, by the server, for the first hash value corresponding to the encrypted traffic-related data in the blockchain network;
        encrypting, by the user terminal, the vehicle driving information using the block generation permission information;
        generating, by the user terminal, a driving information block using the block generation permission information and storing the driving information block in the blockchain network;

generating, by the user terminal, random information by randomly converting the seed information in a number of times, which corresponds to a block number of the generated driving information block; and generating, by the user terminal, a second hash value corresponding to the block generation permission information using the block generation permission information and the random information and storing the second hash value in the blockchain network.

2. The traffic management method of claim 1, further comprising providing, by the server, the reward to the user terminal when the vehicle acts according to the feedback.

3. The traffic management method of claim 1, wherein the traffic-related data comprises at least some of traffic condition information on a number, speeds and locations of vehicles located on a road, road condition information on whether there are icing and construction, weather condition information on weather around the road, and identification and location information of a device that has contributed to collection and provision of the traffic-related data.

4. The traffic management method of claim 1, wherein providing the feedback to the user terminal comprises determining, by the server, traffic safety information and a traffic safety action, which is an action necessary to maintain traffic safety, corresponding to the traffic safety information based on the traffic-related data, and transmitting, by the server, the traffic safety information and the traffic safety action to the user terminal.

5. The traffic management method of claim 4, further comprising providing, by the server, the reward to the user terminal when the vehicle acts according to the traffic safety action.

6. The traffic management method of claim 1, wherein providing the feedback to the user terminal comprises:
 determining, by the server, a plurality of candidate routes based on destination information, input through the user terminal, and a location of the vehicle;
 calculating, by the server, a traffic congestion level for each of the plurality of candidate routes based on the traffic-related data stored in the blockchain network;
 selecting, by the server, a candidate route having a lowest traffic congestion level among the plurality of candidate routes as a recommended route; and
 transmitting the selected recommended route together with one or more other candidate routes to the user terminal.

7. The traffic management method of claim 6, further comprising providing, by the server, the reward to the user terminal when the recommended route is selected through the user terminal.

8. A traffic management system based on a blockchain, the traffic management system comprising:
 a user terminal corresponding to a vehicle;
 a roadside unit (RSU) installed on a roadside, and configured to communicate with at least one of the vehicle and the user terminal corresponding to the vehicle; and
 a server connected to the RSU and the user terminal over a network,
 wherein the RSU directly collects traffic-related data or collects traffic-related data and vehicle driving information from at least one of the vehicle and the user terminal,
 wherein the server transmits block generation permission information to the user terminal,
 wherein the server transmits seed information to the user terminal, wherein the server stores the traffic-related data and the vehicle driving information in a blockchain network, provides feedback to the user terminal based on the traffic-related data, calculates a safe driving index, which is a criterion for determining whether a user has safely driven the vehicle, based on the vehicle driving information stored in the blockchain network, and provides a reward to the user terminal based on the safe driving index, wherein the user terminal encrypts the traffic-related data, stores the encrypted traffic-related data and a first hash value corresponding to the encrypted traffic-related data in the user terminal, and transmits the first hash value to the server, wherein the server stores for the first hash value corresponding to the encrypted traffic-related data in the blockchain network, wherein the user terminal encrypts the vehicle driving information using the block generation permission information, wherein the user terminal generates a driving information block using the block generation permission information and stores the driving information block in the blockchain network, wherein the user terminal generates random information by randomly converting the seed information in a number of times, which corresponds to a block number of the generated driving information block, and wherein the user terminal generates a second hash value corresponding to the block generation permission information using the block generation permission information and the random information and stores the second hash value in the blockchain network.

9. The traffic management system of claim 8, wherein the server provides the reward to the user terminal when the vehicle acts according to the feedback.

10. The traffic management system of claim 8, wherein the traffic-related data comprises at least some of traffic condition information on a number, speeds and locations of vehicles located on a road, road condition information on whether there are icing and construction, weather condition information on weather around the road, and identification and location information of a device that has contributed to collection and provision of the traffic-related data.

11. The traffic management system of claim 8, wherein in providing the feedback to the user terminal, the server determines traffic safety information and a traffic safety action, which is an action necessary to maintain traffic safety, corresponding to the traffic safety information based on the traffic-related data, and transmits the traffic safety information and the traffic safety action to the user terminal.

12. The traffic management system of claim 11, wherein the server provides the reward to the user terminal when the vehicle acts according to the traffic safety action.

13. The traffic management system of claim 8, wherein in providing the feedback to the user terminal, the server determines a plurality of candidate routes based on destination information, input through the user terminal, and a location of the vehicle, calculates a traffic congestion level for each of the plurality of candidate routes based on the traffic-related data stored in the blockchain network, selects a candidate route having a lowest traffic congestion level among the plurality of candidate routes as a recommended route, and transmits the selected recommended route together with one or more other candidate routes to the user terminal.

14. The traffic management system of claim 13, wherein the server provides the reward to the user terminal when the recommended route is selected through the user terminal.

15. A computer-readable storage medium having stored thereon a program for performing the method set forth in claim 1.

* * * * *